Jan. 26, 1960 W. R. YOUNG, JR 2,922,996

TRANSLATOR

Filed Jan. 24, 1956 2 Sheets-Sheet 1

INVENTOR.
W. R. YOUNG, JR.
BY
ATTORNEY

Jan. 26, 1960 W. R. YOUNG, JR 2,922,996

TRANSLATOR

Filed Jan. 24, 1956 2 Sheets-Sheet 2

INVENTOR
W. R. YOUNG, JR.
BY
ATTORNEY

United States Patent Office 2,922,996

Patented Jan. 26, 1960

2,922,996

TRANSLATOR

William R. Young, Jr., Summit, N.J., assignor to Bell Telephone Laboratories, Incorporated, New York, N.Y., a corporation of New York Application January 24, 1956, Serial No. 561,056

16 Claims. (Cl. 340—347)

Figures 1, 2:
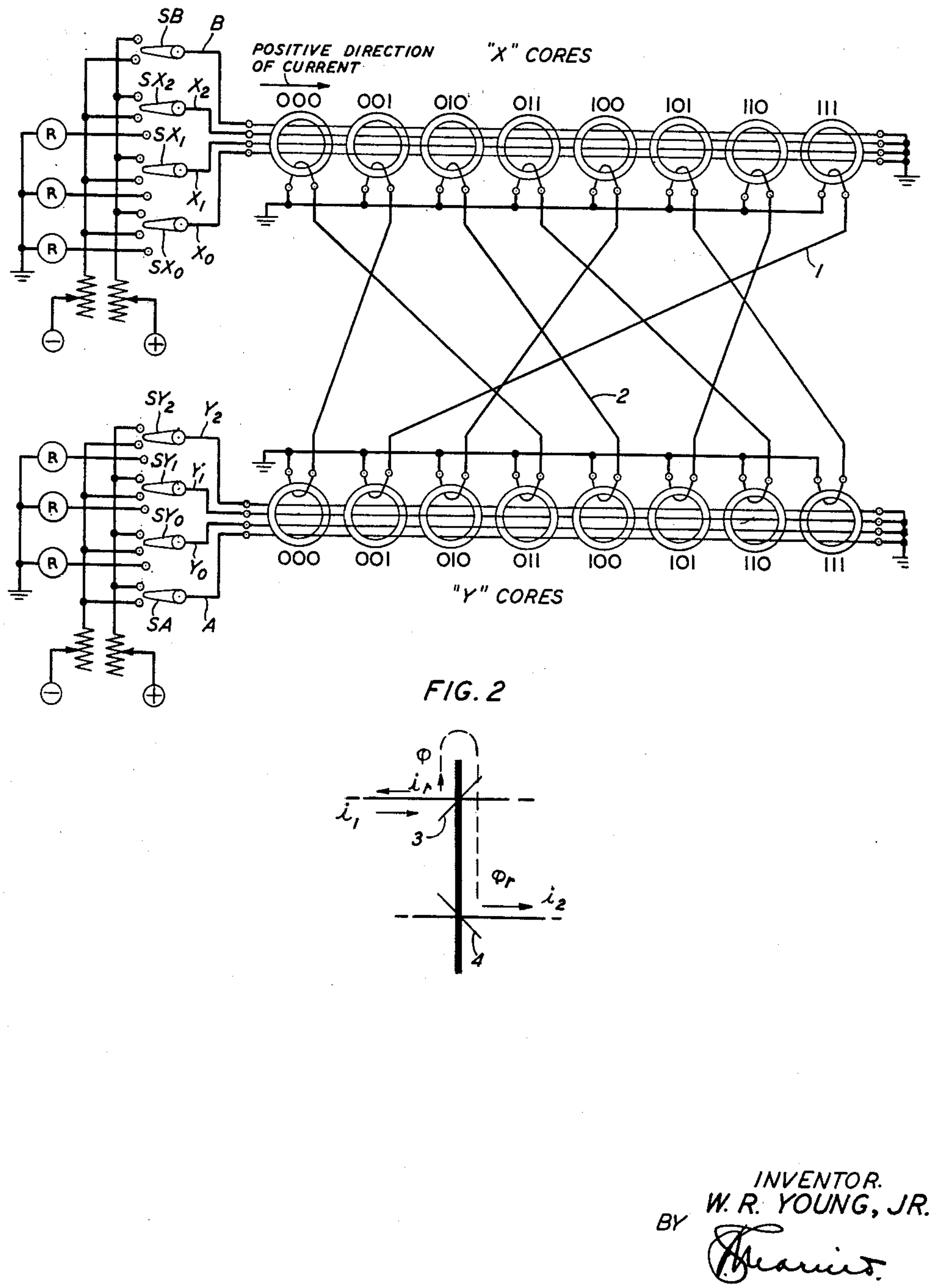

This invention relates to a ferromagnetic translator and more specifically to a reversible translator utilizing rectangular hysteresis loop cores as switching elements.

A translator is a switching system element which, under the stimulus of a request in the form of an input code, responds in the form of a predetermined output code to the element presenting the input code, or to some other element.

A particular necessity in the area of data transmission and switching is a translating device for conveniently, economically, rapidly and reliably converting from one binary code to another. This is essential, since, in the transmission of switching or information data, a large number of rapid transformations to different codes may be required.

An object of this invention, therefore, is to provide translation from one binary code to another binary code.

Another object of this invention is translation from one binary code to another binary code in which separate inputs are utilized to represent the two binary conditions.

Still another object of this invention is a translator which is fully reversible in operation.

A feature of this invention is the use of single conductor interconnecting jumpers between input and output elements, providing a high degree of flexibility in altering the translated code.

Another feature of this invention is the use of reliable, low cost, rectangular hysteresis loop magnetic cores as switching elements.

These and other objects and features may be accomplished by the use of a circuit including a plurality of rectangular hysteresis loop cores as input elements, and an equal number of cores for the output symbols. Conductors are wound through all of the cores in accordance with a code. A signal is applied momentarily and simultaneously to selected leads in accordance with the code to be translated. In addition, a bias current is applied simultaneously to each core. The aggregate effect is such that only one input core is permitted to set. Setting of the selected core induces current in a path linking it to a corresponding output core. This current, aided by a positive bias current in all of the output cores, sets a particular output core, thereby inducing a voltage in the leads threaded therethrough. The voltage on these leads can be detected and identified to determine the correct translated symbols. In completing the cycle and before accepting the next signal, reset currents are applied to the bias windings, causing all of the set cores to be restored to normal.

Alternatively, an input core may be initially set by energizing selected leads traversing said core. Subsequently, the selected core may be reset and the voltage and current induced by the change of flux due to the resetting are used to further set a selected core in the group of output cores. All of the output cores are than reset and a signal is generated on the output leads as described above, which signal may be detected and identified.

"Setting," in the context of this application, refers to the passage of a core from an original magnetic state to the opposite magnetic state. Both of these magnetic conditions are stable, and the cores herein employed will remain for an infinite period in the magnetic state to which they are driven.

"Resetting" refers to the return of a core to its original magnetic state.

Figure 3:
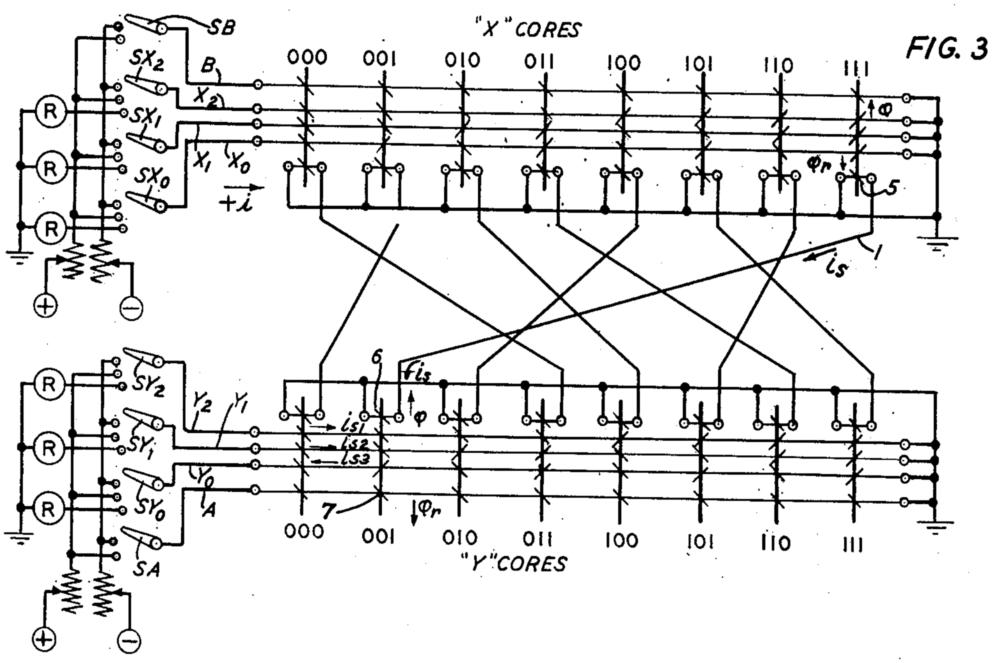
Figure 4:
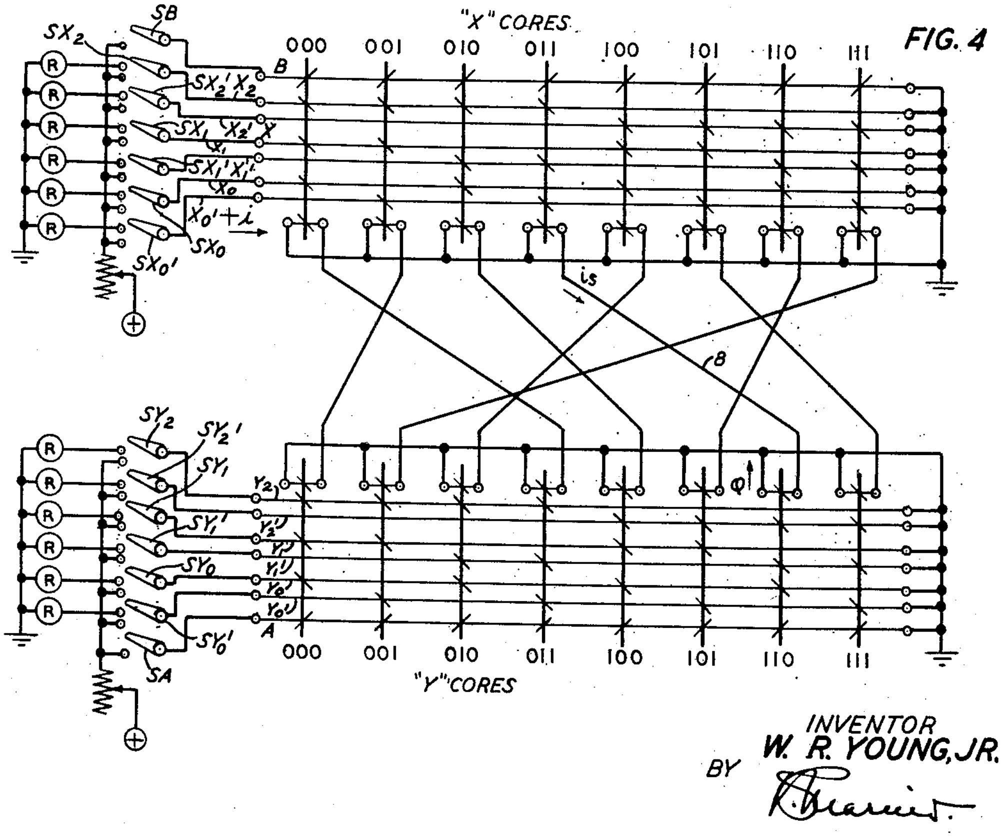

The above objects and features of the invention will be more readily understood by reference to the accompanying description, appended claims and drawings in which:

Fig. 1 shows a circuit embodying the invention in conjunction with a reversible magnetic core binary-to-binary translator in which flexibly arranged interconnecting jumpers are utilized to cross-connect input and output cores;

Fig. 2 indicates the relationship of current and flux flow in a circuit employing magnetic core "mirror" symbols;

Fig. 3 is the same circuit as Fig. 1 using an improved magnetic core short hand and mirror symbols as a convenient means of representing the physical circuit; and Fig. 4 is a mirror symbol equivalent of a circuit embodying an alternative form of the invention in conjunction with a reversible magnetic core binary-to-binary translator utilizing separate inputs in each core for each of the binary conditions.

Referring now to Fig. 1, a circuit is shown in which eight magnetic input cores "X" representing the input elements of the translator are all selectively threaded by the same four conductors, namely, a bias conductor B and three signal conductors $X_0$, $X_1$ and $X_2$. An input core is provided for each of the eight symbols to be translated. In Fig. 1, these cores are collectively referred to as "X" cores and are individually labeled with the appropriate binary number in accordance with the direction in which the wires are threaded therethrough. For explanatory purposes it may be assumed that the current necessary to set a particular core is $i_0$. The magnitude of signal current in each lead $X_0$, $X_1$ and $X_2$ is also arranged to be equal to $i_0$. Likewise, the bias current applied to lead B is $i_0$.

The group of eight output, or "Y," cores is arranged similarly to the group of eight input, or "X" cores, each output core being designated in Fig. 1 according to its appropriate binary number. Four conductors A, $Y_0$, $Y_1$, and $Y_2$ selectively thread each of the eight cores in accordance with the particular binary number designated by each of said cores. It may be noted, however, that bias lead A is to have a bias current applied to it which is less than $i_0$ and in a negative direction, for example, $-\frac{1}{2}i_0$.

In operation, signals are applied momentarily and simultaneously to leads $X_2$, $X_1$ and $X_0$ in accordance with the elements of the code symbol to be translated. A "1" signal is represented by current in a positive direction from left to right as in Fig. 1 (wherein the arrow indicates positive current) and a "0" signal by negative current. These signals are applied by operating switches S—in the appropriate direction as indicated in Fig. 1. The switches S—are also capable of connecting individual detecting devices R shown in symbolic form in Fig. 1 to the signal conductors $X_0$, $X_1$, $X_2$, $Y_0$, $Y_1$ and $Y_2$. The particular devices R that are connected in a given operation depend on the direction in which translation is to be effected, as will be explained herein. Assuming, in Fig. 1, that current through core and into the page sets the core, a series of illustrative inputs will demonstrate the operation of the translator.

For example, if the input applied to the "X" cores by momentarily connecting switches $SX_2$, $SX_1$ and $SX_0$ to the positive voltage source is "111," the $X_2$, $X_1$ and $X_0$ leads each carries a current and together pass $3i_0$ through input core "111" in a direction tending to set the core. The bias current through lead B, occasioned by connecting switch SB to the positive voltage source, is and traverses the core in a direction which tends to oppose the setting thereof. As a result, "X" core "111" is subjected to a total aggregate "setting" current of $2i_0$ therethrough, which is ample for the reliable setting of said core.

Further, it may be shown that the resultant current in any other core is either zero or in opposition to the setting of that core. For example, "X" core "110" has a setting current of $2i_0$ as the result of leads $X_1$ and $X_2$ being activated. This current is opposed and neutralized by a current of $2i_0$, the sum of the opposing currents flowing through lead B and lead $X_0$. Consequently, the total resulting current traversing "X" core "110" is zero.

"X" "100" under the same condition is traversed by a "setting" current of $i_0$ over lead $X_2$ and an opposing current of $3i_0$ through leads B, $X_1$ and $X_0$. As a result, the aggregate effective current passing through "X" core 100 is $2i_0$, but is in a resetting direction.

If the current components passing through each of the remaining "X" cores are analyzed, it will be seen that the only core which is subjected to a setting current of $i_0$ or greater is core 111. All other cores are subjected to a sum total current which is equal to zero or a finite value of current, but in a reset direction. Since the cores are originally magnetized in the reset state, it follows that core 111 will be the only core to be set.

Continuing the operation of the embodiment depicted in Fig. 1, it will be seen that under the assumed condition of leads $X_0$, $X_1$ and $X_2$ energized in the positive direction, core 111 sets, occasioning a rapid flux change which in turn induces a voltage in jumper 1 threaded therethrough. This voltage creates a current through jumper 1 which at its "Y" core end is threaded through core 001. The current through conductor 1 acts in conjunction with the current through conductor A which illustratively may be $-\frac{1}{2}i_0$ to reliably set "Y" core 001, causing a change of flux therein which acts to induce voltages in leads $Y_2$, $Y_1$ and $Y_0$. These voltages may be detected by devices R to identify the core which has been set, switches $SY_0$, $SY_1$ and $SY_2$ having been previously set to their associated indicating devices R. The particular devices R for detecting and identifying have been set forth symbolically in Fig. 1, it being understood that any electroresponsive device, such as a polarized relay, galvanometer or any binary indicating device capable of signifying either of two possible conditions may be employed.

The above example illustrates the translation of binary number 111 in the "X" group of cores to binary number 001 in the "Y" group of cores. After the translation has been effected, a restoring current is momentarily applied to conductors A and B by setting switches SA and SB to positive battery to reset the cores that were set during the translation operation. In so doing, the cycle is completed and the device is available for additional translation.

In the illustration used it was assumed that the "X" group of cores was the input group and the "Y" group of cores was the output. In consequence, the signal currents were applied to conductors $X_0$, $X_1$ and $X_2$. A feature of the present invention, however, is the facile reversibility of the translation procedure. If input signals are applied to leads $Y_0$, $Y_1$ and $Y_2$ a translation may be effected and the voltages induced by the output core in the "X" group detected and identified by sampling leads $X_0$, $X_1$ and $X_2$. In so doing, it should be pointed out that the direction of current bias in leads A and B is required to be interchanged. For a reverse translation, lead A is assumed to have a current in the positive direction equal to $i_0$ and lead B to have a current in the negative direction equal to $-\frac{1}{2}i_0$.

Assuming for purposes of illustration that the input signal pulses on leads $Y_2$, $Y_1$ and $Y_0$ are for the binary number 100, "Y" core 100 will have an aggregate setting current therethrough equal to $3i_0$, minus the bias current $i_0$ or $2i_0$. All other cores, as explained above, may be shown to have a total current therethrough of zero or a finite current in the reset direction. Under these circumstances, core 100 in the "Y" group will set, undergoing a relatively high internal flux change which induces a voltage in jumper 2 threaded therethrough. This voltage in turn creates current flow through jumper 2 which threads core 010 in the "X" group of cores, causing said core to set and shift in magnetic state. This change in magnetic state produces a voltage in leads $X_2$, $X_1$ and $X_0$, which may be detected and identified as explained above to determine which core has been set. To complete the cycle, reset currents are applied to bias leads A and B to reset all cores that have been changed in magnetic state.

An alternative method of operation would be to complete the cycle in a series of steps as follows: Leads $X_2$, $X_1$ and $X_0$ are energized in the positive direction to set "X" core 111. The voltage induced in leads $Y_2$, $Y_1$ and $Y_0$ is not detected at this time. Instead, the next step is to reset all of the "X" cores by applying a reset current to bias conductor B. As a result, the flux change in core 111 causes a voltage to be induced in jumper 1 and a current to flow through jumper 1 and around core 001 of the "Y" group as described above. This current is utilized to create a magnetic flux to set core 001. The voltage which is induced in leads $Y_2$, $Y_1$ and $Y_0$ is still not detected but, instead, a subsequent restoring current pulse or reset current is applied to conductor A causing all of the cores to reset, at which time leads $Y_0$, $Y_1$ and $Y_2$ are detected and identified to establish the translation. Under these conditions the bias on lead A of $\frac{1}{2}i_0$ is in a positive direction as is the bias of $i_0$ on lead B. In addition, the original magnetization or reset state of the "Y" group of cores is opposite to that of the "X" group, i.e., the original magnetization or reset state of the "X" group is that produced by a positive current pulse on lead B, whereas the reset state of the "Y" group is that produced by a negative current pulse on lead A.

It may be noted that this operating procedure is adapted to be reversible with an equal degree of facility as the first enumerated one.

Fig. 2 indicates the polarity of applied and induced currents in the windings as may be determined from the "mirror symbols" utilized in Figs. 3 and 4. Mirror symbols are a compact and convenient means for determining the polarity of induced voltage or current flow in secondary windings. In these symbols, cores (vertical lines) and conductors (horizontal lines) are represented by line segments crossing at right angles. A winding is represented by a "mirror" passing through the intersection at an angle of 45 degrees. Winding polarity is indicated by the slope of the mirror. The convention is that current approaching the core is reflected off the mirror to generate a resulting flux.

Referring to Fig. 2, it may be seen that the direction of the induced flux $\phi$ is upward since the input current $i_1$ is reflected by the mirror in an upwardly direction. The induced flux is traced to the end of the core and reflected back as shown for $\phi_r$. Tracing the reflected flux $\phi_r$ back down the core and reflecting off each mirror, the direction of current flow in the corresponding winding is established. It may be seen that the induced current $i_r$ flows in the input winding 3 in a direction opposite to the input current $i_1$. This clearly conforms with Lenz's law. The current $i_2$ in the secondary winding is in the direction shown since the return flux $\phi_r$ is reflected off the output winding 4, to the right.

For a further exposition of this type of notation reference may be made to an article entitled "Pulse Switching Circuits Using Magnetic Cores" by M. Karnaugh, Proceedings of the I.R.E., volume 43, No. 5, p. 572, May 1955, and "A Proposed Symbol for Magnetic Circuits,"

by R. P. Mayer, Engineering Note E–472, Digital Computer Laboratory, Massachusetts Institute of Technology, August 14, 1952.

Referring now to Fig. 3, which is the equivalent in all respects of Fig. 1, but in mirror symbol form, it may be seen that if input currents of $i_0$ in a positive direction are applied to leads $X_0$, $X_1$ and $X_2$, the total setting current traveling through the core will be equal to $3i_0 - i_0$ in conductor B, yielding an aggregate current of $2i_0$ which will set "X" core 111. No other "X" cores will be set as a result of the direction of the windings thereon as explained above. Jumper 1 will have a current induced therein as a result of the setting of core 111, which current may be traced through jumper 1 and the associated winding 6 of core 001 in the "Y" group of cores. The current traveling through jumper winding 6 plus the bias current of $-\frac{1}{2}i_0$ traveling through conductor A in core 001, will act conjointly to set core 001, during which time leads $Y_0$, $Y_1$ and $Y_2$ may be detected and identified to establish the translation from binary number 111 to binary number 001.

It may be noted that in the above mirror symbol terminology, it is assumed that magnetization in the upward direction tends to set the core and magnetization in the downward direction tends to reset the core.

The directions of current and flux flow as indicated in Fig. 3 are derived from the relationships set forth in Fig. 2. Since the direction of the aggregate setting current flow of $2i_0$ is from left to right, the flux $\phi$ resulting therefrom is in an upward direction tending to set core 111. Tracing the flux $\phi$ to the end of the core, we find that the reflected flux $\phi_r$ is reflected off output winding 5 in such a direction as to cause a current flow $i_s$ in jumper 1. This current, flowing through input winding 6 together with the negative bias current through winding 7, produces a flux $\phi$ in the upward direction tending to set the core. The reflected flux $\phi_r$ produces secondary currents $i_{s1}$, $i_{s2}$ and $i_{s3}$ in the directions shown, which may be detected and identified as described above to indicate that "Y" core 001 has been set.

Thus in Fig. 3 the translation may be followed as in Fig. 2 but with greater facility. In addition, secondary currents in windings may be determined directly from the drawings without the distraction of intermittently resorting to arbitrary rules to ascertain directions of current and flux flow.

It will be noted in the examination of Fig. 1 and in particular of Fig. 3, that the conductors are threaded through half of the cores in the "X" group and the "Y" group in a given direction and the remaining cores in the opposite direction. This is a desirable feature which provides for inherent minimization of spurious voltages induced in the conductors by virtue of slight changes of flux, as a result of the lack of perfect rectangularity of the hysteresis curve. For example, it may be seen that conductor $X_2$ in Fig. 3 is subjected to induced voltages from four of the cores in a particular direction and from three others in an opposite direction, in addition to the voltage induced by the core that is set. The symmetry of winding or threading of the conductors consequently produces an automatic neutralization or substantial balancing of undesired and spurious signals.

Referring to Fig. 4 an alternative embodiment of the invention is illustrated, wherein each input is in the positive direction but connected to different leads to represent "1's" and "0's." Currents in leads $X_2$, $X_1$ and $X_0$, $Y_2$, $Y_1$ and $Y_0$ represent "1's." Currents in $Y_2'$, $Y_1'$ and $Y_0'$, $X_2'$, $X_1'$ and $X_0'$ represent "0's." In this instance, the bias current in conductor B is $2i_0$ and in a direction to set a core which is not otherwise impeded from setting. The signal currents in the X, X', Y and Y', leads are also $2i_0$ in this instance.

Assume, for example, that the binary number to be translated is 0111. In this instance, current would be applied to $X_2'$, $X_1$ and $X_0$ by momentarily operating switches $SX_2'$, $SX_1$ and $SX_0$. No current is applied to leads $X_2$, $X_1'$ and $X_0'$. Examining Fig. 4, it may be seen that the leads carrying current do not thread core 011 and that the leads threading this core do not carry current. As a consequence, the bias current of $2i_0$ through conductor B produces a flux in core 011, setting that core. It may be seen that all other "X" cores surround at least one of the signal input leads carrying current. For example, core 101 has currents therethrough of $2i_0$ in conductor B, $2i_0$ in conductor $X_2'$ and $2i_0$ in conductor $X_1$. Since the B conductor and the $X_1$ and $X_2'$ conductors are threaded in opposite directions on core 101, the aggregate current in core 101 is $2i_0$ in a direction to oppose setting.

Continuing the operation, it may be seen that the setting of core 011 induces a current $i_s$ in jumper 8, which in turn creates a flux $\phi$ in "y" core 110. The flux through core 110, as a result of the current through jumper 8 in conjunction with the flux through core 110 produced by the negative bias current (which, for example, may be ½ $i_0$ through conductor A, is sufficient to set the core or change its magnetic state. In so doing a voltage is induced in the leads threaded through core 110 in the "Y" group of cores, which voltage may be detected in the manner described above to complete the translation.

In translating from one binary number to another, using the embodiment of Fig. 4, a single process similar to the one first described for Fig. 2, may be utilized, in which a signal is applied to the "X" leads, the "Y" leads being scanned and detected simultaneously with the input to said "X" leads. Alternatively, the translation may proceed in a series of steps, also as described above, in which the particular "X" core is set and then reset, which latter operation effects the setting of the associated core in the "Y" group. The "Y" group core is then reset and the voltage indication is read on the "Y" leads to establish the actual translation.

Further, the embodiment of Fig. 4 is reversible with equal facility and in the same manner as that described in Fig. 2.

It will also be apparent to those skilled in the art that combinations of the embodiments of Figs. 1 and 3 and Fig. 4 are feasible. For example, the embodiment of Fig. 1 or 3 may be used as the configuration for the "X" cores and the species of Fig. 4 may be used as the circuit for the "Y" group of cores.

It is understood that the embodiments depicted are merely illustrative and that other combinations and arrangements will be apparent to those skilled in the art without departing from the scope or spirit of the invention.

What is claimed is:

1. A ferromagnetic core translator comprising a first and second group of rectangular hysteresis loop cores, a plurality of signal conductors threaded through said cores in accordance with a code, a bias winding on each of said cores, a conductor linking each core in said first group with an associated core in said second group, means for energizing selected signal conductors in only said first group of cores thereby setting one of said cores in said first group and a corresponding core in said second group, and means for identifying which core in said second group is set.

2. A ferromagnetic core translator comprising a first and second group of rectangular hysteresis loop cores, each of said cores signifying a particular binary number, a plurality of signal conductors threaded through said cores in accordance with the binary numbers said cores signify, a bias winding on each of said cores, a jumper conductor linking each core in said first group to an associated core in said second group, means for energizing selected conductors in said first group of cores thereby setting one of said cores in said first group, means for thereafter resetting said one core in said first group thereby inducing a current in said jumper conductor to set said associated core in said second group, means for thereafter resetting said core in said second group thereby inducing a voltage in said signal conductors threaded therethrough, and means for detecting said voltages and identifying which core in said second group is set.

3. A ferromagnetic core translator comprising a first and second group of rectangular hysteresis loop cores, each of said cores representing a particular binary number, a plurality of signal conductors threaded through each of said groups of cores in accordance with the binary number each of said cores represents, a bias winding threaded through each of said groups of cores, a jumper conductor linking each core in said first group to a related core in said second group, means for energizing said bias winding in said first group of cores in a positive direction, means for energizing said bias winding in said second group of cores in a negative direction, said current in said bias winding in said second group of cores having a lower magnitude than the current in said bias winding of said first group of cores, means for selectively energizing said signal conductors threaded through said cores in said first group in a predetermined direction, thereby setting one of said cores in said first group and said related core in said second group, and means for detecting said signal conductors in said second group to identify said related core.

4. A ferromagnetic core translator comprising a first and second group of eight rectangular hysteresis loop cores each, three signal conductors threaded through said cores in each group in accordance with a code, each of said signal conductors being threaded through one half of said cores in each group in a given direction and an equal number of cores in the same group in the opposite direction, a bias winding threaded through each of said groups of cores, a jumper conductor linking each of said cores in said first group to an associated core in said second group in accordance with a predetermined arrangement, means for energizing said bias windings in varying magnitudes and directions in accordance with the direction of translation between said groups, means for energizing three selected signal conductors in said first group of cores in a predetermined direction, thereby setting one of said cores in said first group and the associated core in said second group, and means for detecting said signal conductors in said second group to identify said associated core.

5. A reversible ferromagnetic core translator comprising a first and second group of rectangular hysteresis loop cores, each of said cores signifying a particular binary number, a plurality of signal conductors threaded through said groups of cores in accordance with the binary numbers said cores represent, a bias winding on each of said cores, a jumper conductor linking each core in said first group to a related core in said second group, means for energizing selected signal conductors in either of said group of cores and for energizing said bias windings in varying magnitudes and directions to set a selected core in one group and the related core in the other group, means for detecting said signal conductors in said other group of cores to identify said related core, and means for interchanging and receiving the input signals and output signals on said first and said second group of cores to operate said translator in either direction.

6. A bidirectional ferromagnetic core translator comprising a first and second group of rectangular hysteresis loop cores, a bias winding on each of said cores, a plurality of pairs of signal conductors threaded through each group of cores according to a code, a conductor linking each core in said first group to an associated core in said second group, means for energizing said bias windings in varying directions and amplitudes in accordance with the direction of signal travel between said groups, means for energizing selected signal conductors in said first group of cores thereby setting one of said cores in said first group and the associated core in said second group, and means for detecting said signal conductors in said second group to identify said associated core.

7. A reversible ferromagnetic core translator comprising two groups of rectangular hysteresis loop cores, each of said cores representing a particular binary number, a bias winding individual to each of said groups of cores, a plurality of pairs of signal conductors threaded through said groups of cores in accordance with the binary numbers said cores represent, a jumper linking each core in one of said groups to an associated core in the other of said groups, means for energizing the bias windings in said groups of cores in varying directions and magnitudes in accordance with the direction in which signals are to travel between said groups, means for energizing one signal conductor in each of said pairs of conductors in either of said groups to set a selected core in said group and the associated core in the other group, and means for detecting the conductors in the other group of cores which are thereby energized to identify said associated core.

8. A reversible ferromagnetic core translator comprising a first and second group of rectangular hysteresis loop cores, each of said cores signifying a binary number, a plurality of signal conductors threaded through each of said groups of cores in accordance with a code, each of said signal conductors being threaded through a given number of cores in one direction and through an equal number of cores in the same group in the opposite direction, a bias winding on each of said cores, means for energizing said bias winding in accordance with the direction of translation, a jumper linking each core in said first group to a related core in said second group, means for directionally energizing selected signal conductors in either of said groups of cores thereby setting one of said cores in said group surrounding the selected conductors and the related core in the other group, and means responsive to the setting of said related core for identifying said related core.

9. A two-way ferromagnetic core translator comprising a first and second group of eight rectangular hysteresis loop cores each, each of said cores signifying a binary number, three pairs of signal conductors threaded through the cores of each group in accordance with the binary numbers said cores represent, a bias winding on each of said groups of cores, a jumper linking each core in said first group to a related core in said second group, means for energizing said bias winding in said first group of cores in a given direction, means for energizing said bias winding in said second group of cores in an opposite direction, means for energizing selected signal conductors in either group of cores thereby changing the magnetic state of one of said cores in said group and a related core in the other group, and means for detecting said signal conductors in said other group to identify said related core.

10. A reversible ferromagnetic binary code translator comprising a first and second group of eight rectangular hysteresis loop cores, each of said cores signifying a particular binary number, three signal conductors threaded through each of said groups of cores in accordance with a code, each of said conductors in each group being threaded through a given number of cores in one direction and through an equal number of cores in the same group in the opposite direction, a bias winding on each of said groups of cores adapted to be energized in one of two polarities with varying magnitudes, an output winding on each of said cores, a jumper connector linking the output winding of each core in said first group to the output winding of an associated core in said second group, means for energizing three of said signal conductors in one of said groups of cores in predetermined directions thereby setting one of said cores in said one group and the associated core in the other group, and means for detecting said signal conductors in said second group to identify said associated core.

11. A bidirectional ferromagnetic core translator comprising a first and second group of rectangular hysteresis loop cores, each of said cores representing a particular binary number, a first and second group of signal conductors individually threaded through said first and second group of cores respectively in accordance with the binary number each of said cores represents, a bias winding threaded through each of said groups of cores, a jumper conductor linking each core in said first group to a related core in said second group, means for energizing said bias winding in said first group of cores in a positive direction, means for energizing said bias winding in said second group of cores in a negative direction, said current in said bias winding in said second group of cores having a lower magnitude than the current in said bias winding of said first group of cores, means for selectively energizing said first group of signal conductors in a predetermined direction, thereby setting one of said cores in said first group of cores and said related core in said second group of cores, and means for detecting said second group of signal conductors to identify said related core.

12. A reversible ferromagnetic core translator comprising a first and second group of rectangular hysteresis loop cores, each of said cores signifying a particular binary number, a first and second group of signal conductors threaded through said first and second group of cores respectively in accordance with the binary numbers said cores represent, a bias winding on each of said cores, means for coupling each core in said first group to a related core in said second group, means for energizing selected conductors in either of said groups of signal conductors and for energizing said bias windings in varying magnitudes and directions to set a selected core in one group and the related core in the other group of cores, means for detecting said group of signal conductors threaded through said other group of cores to identify said related core, and means for interchanging and receiving the input signals and output signals on said first and said second group of signal conductors to operate said translator in either direction.

13. A bidirectional ferromagnetic core translator comprising a first and second group of rectangular hysteresis loop cores, a bias winding on each of said cores, a first and second group of pairs of signal conductors threaded through said first and second group of cores respectively according to a code, a conductor linking each core in said first group to an associated core in said second group, means for energizing said bias windings in varying directions and amplitudes in accordance with the direction of signal travel between said groups of cores, means for energizing selected ones of said first group of signal conductors thereby setting one of said cores in said first group of cores and the associated core in said second group of cores, and means for detecting said second group of signal conductors to identify said associated core.

14. A reversible ferromagnetic core translator comprising two groups of rectangular hysteresis loop cores, each of said cores representing a particular binary number, a bias winding individual to each of said groups of cores, a first and second group of pairs of signal conductors threaded through said two groups of cores respectively in accordance with the binary numbers said cores represent, means for coupling each core in one of said groups of cores to an associated core in the other of said groups of cores, means for energizing the bias windings in said groups of cores in varying directions and magnitudes in accordance with the direction in which signals are to travel between said groups of cores, means for energizing one signal conductor in each of said pairs in either said first or second group of signal conductors to set a selected core in said group and the associated core in the other group of cores, and means for detecting the signal conductors threaded through the other group of cores which are thereby energized to identify said associated core.

15. A reversible ferromagnetic core translator comprising a first and second group of rectangular hysteresis loop cores, each of said cores signifying a binary number, a first and second group of signal conductors individually threaded through said first and said second group of cores respectively in accordance with a code, each of said signal conductors being threaded through a given number of cores in one direction and through an equal number of cores in the same group in the opposite direction, a bias winding on each of said cores, means for energizing said bias winding in accordance with the direction of translation, means for coupling each core in said first group to a related core in said second group, means for directionally energizing selected signal conductors in either of said first and said second group of signal conductors thereby setting one of said cores in said group of cores surrounding the selected conductors and the related core in the other group, and means responsive to the setting of said related core for identifying the said related core.

16. A two-way ferromagnetic core translator comprising a first and second group of eight rectangular hysteresis loop cores each, each of said cores signifying a binary number, a first group of three pairs of signal conductors threaded through said first group of cores, a second group of three pairs of signal conductors threaded through said second group of cores, said signal conductors being threaded through the cores in accordance with the binary numbers said cores represent, a bias winding on each of said groups of cores, means for coupling each core in said first group to a related core in said second group, means for energizing said bias winding in said first group of cores in a given direction, means for energizing said bias winding in said second group of cores in an opposite direction, means for energizing selected ones of said signal conductors in either of said first and second group of signal conductors thereby changing the magnetic state of one of said cores surrounding said selected conductors and said related core in the other group of cores, and means for detecting said signal conductors threaded through said other group of cores to identify said related core.

References Cited in the file of this patent

UNITED STATES PATENTS

| | | |
|---|---|---|
| 2,369,474 | Luhn | Feb. 13, 1945 |
| 2,518,022 | Keister | Aug. 8, 1950 |
| 2,734,182 | Rajchman | Feb. 7, 1956 |
| 2,768,367 | Rajchman | Oct. 23, 1956 |